(12) United States Patent
Norfolk

(10) Patent No.: US 12,512,684 B2
(45) Date of Patent: Dec. 30, 2025

(54) WIRELESS DEVICE CHARGER DEVICE AND METHOD OF USE

(71) Applicant: Depaillius Norfolk, Covington, TN (US)

(72) Inventor: Depaillius Norfolk, Covington, TN (US)

( * ) Notice: Subject to any disclaimer, the term of this patent is extended or adjusted under 35 U.S.C. 154(b) by 500 days.

(21) Appl. No.: 17/676,951

(22) Filed: Feb. 22, 2022

(65) Prior Publication Data

US 2023/0268749 A1    Aug. 24, 2023

(51) Int. Cl.
*H02J 7/00* (2006.01)
*H01R 24/60* (2011.01)
*H02J 7/02* (2016.01)
*H02J 50/00* (2016.01)
*H02J 50/10* (2016.01)

(52) U.S. Cl.
CPC ............ *H02J 7/0045* (2013.01); *H01R 24/60* (2013.01); *H02J 7/0047* (2013.01); *H02J 7/02* (2013.01); *H02J 50/005* (2020.01); *H02J 50/10* (2016.02); *H01R 2201/26* (2013.01); *H02J 2207/40* (2020.01)

(58) Field of Classification Search
CPC .......... H02J 7/0045; H02J 7/0047; H02J 7/02; H02J 50/005; H02J 50/10; H02J 2207/40; H02J 7/0013; H02J 7/0042; H02J 7/0044; H01R 24/60; H01R 2201/26

USPC .......................................................... 320/108
See application file for complete search history.

(56) References Cited

U.S. PATENT DOCUMENTS

| | | |
|---|---|---|
| 7,006,851 B2 | 2/2006 | Holmes et al. |
| 10,389,160 B2 | 8/2019 | Miller et al. |
| 10,862,330 B2 | 12/2020 | Piunti |
| 11,095,144 B2 | 8/2021 | Soriano |
| 2004/0204177 A1 | 10/2004 | Piunti et al. |
| 2015/0270737 A1* | 9/2015 | Shirakawa ............ H02J 7/0044 320/108 |
| 2016/0156216 A1* | 6/2016 | Nakao ..................... H02J 50/10 320/108 |
| 2018/0069358 A1* | 3/2018 | Miller ................... H02J 7/0042 |

\* cited by examiner

*Primary Examiner* — Paul Dinh
(74) *Attorney, Agent, or Firm* — Edison Law Group, PLLC

(57) ABSTRACT

A wireless charging device is provided. The device has a charging transmitter component and a receiving charger component. The charging transmitter component has two male connectors, one for connecting to a source of AC power, the other for connecting to a USB port. A step down transformer is connected to the source of AC power, and both the USB male connector and the transformer are electrically connected to a wireless USB transmitter. The receiving charger component is device specific and receives a charging signal from the USB transmitter when plugged into a device charging port.

10 Claims, 3 Drawing Sheets

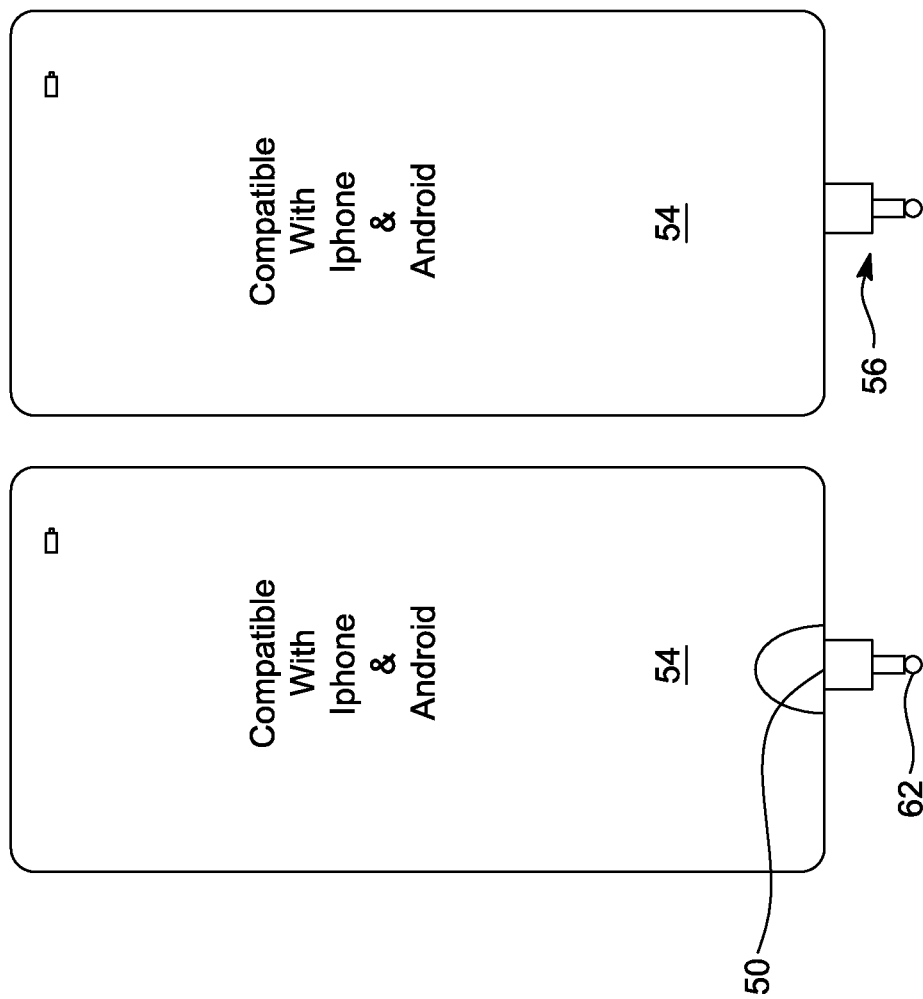

WIRELESS DEVICE CHARGER DEVICE AND METHOD OF USE

FIELD OF THE INVENTION

The present invention relates generally to charging devices. More particularly, the invention relates to a charging device and method of use that can wirelessly charge a number of devices.

BACKGROUND OF THE INVENTION

Since the advent of small, portable electronic devices there have been issues with charging. Charging was conventionally done by connecting a charging device to a source of AC or DC power via a charging wire have a male connector with a configuration specific to one or more devices. For example, an android smart phone may use a USB type C connector. These devices were not problematic for home use but were unwieldy "on the go" as an adapter (to step down voltage and current) and a charging cord had to be carried about. When used in an automotive environment, a specially designed USB charger, configured to use with an automotive auxiliary power outlet, was required. Newer automobiles have USB outlets for charging, but these still require a specific charging cord.

As a result of the inconvenience of prior methods, wireless charging devices have been developed. These devices typically include an adapter/converter device for producing an EM charging signal connected to a charging pad or a cradle having a charging pad therein. The drawback of these types of devices is that the cradle has to be reconfigured to support devices of different sizes which tends to make them bulky. Also, if merely a charging pad is used, it can only charge one device at a time, and has no mechanical means to stabilize the device against movement in, e.g, an mobile environment. In an automotive environment, the bulkiness of these devices may make them nearly impossible to use depending upon the configuration of the automobile interior. Also, in the automotive environment a wireless charging pad is only positioned in one place and it can only charge one device at a time.

SUMMARY OF THE INVENTION

A wireless charging device is provided. The device has a charging transmitter component and a receiving charger component. The charging transmitter component has two male connectors, one for connecting to a source of AC power, the other for connecting to a USB port. A step down transformer is connected to the source of AC power, and both the USB male connector and the transformer are electrically connected to a wireless USB transmitter. The receiving charger component is device specific and receives a charging signal from the USB transmitter when plugged into a device charging port. In accordance with the method of the invention, the receiving charger component remains in the device at all times. Any devices within range of the charging transmitting component can be charged allowing for multiple devices to be charged simultaneously.

It is a major object of the invention to provide an improved apparatus for charging electronic devices.

It is another object of the invention to provide an improved apparatus for wirelessly charging electronic devices.

It is another object of the invention to provide an improved apparatus for wirelessly charging electronic devices that does not require a cradle.

It is another object of the invention to provide an improved apparatus for wirelessly charging electronic devices that can be used with virtually any battery powered electronic device.

It is another object of the invention to provide an improved apparatus for wirelessly charging electronic devices that provides an indication of charging status.

It is another object of the invention to provide an improved apparatus for wirelessly charging electronic devices that can charge multiple device simultaneously.

BRIEF DESCRIPTION OF THE DRAWINGS

FIG. 3 shows a plan view of a device using a receiving component of the charging device of the invention.

DETAILED DESCRIPTION

Figure 1:
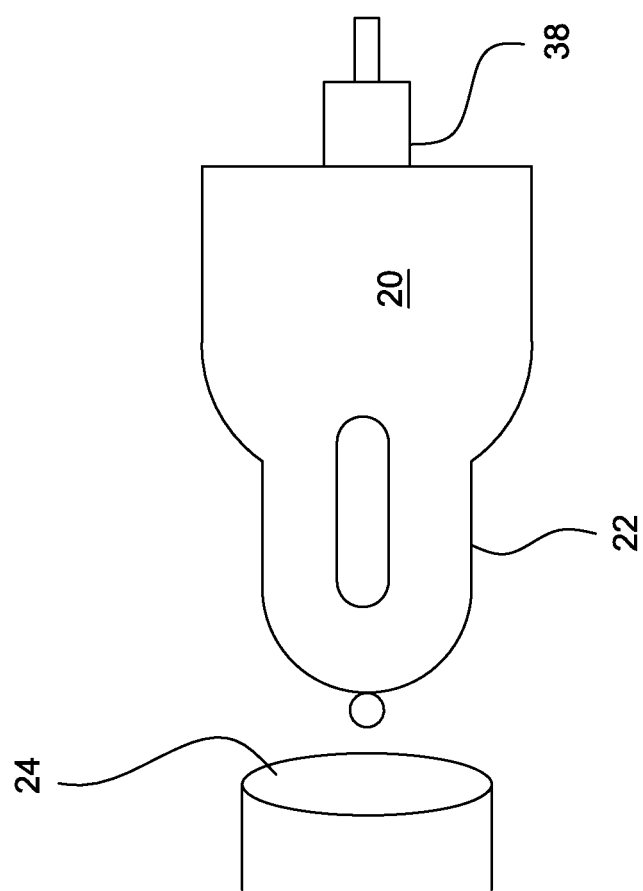
FIG. 1 shows a plan view of a first embodiment of the charging device of the invention.
Figure 2:
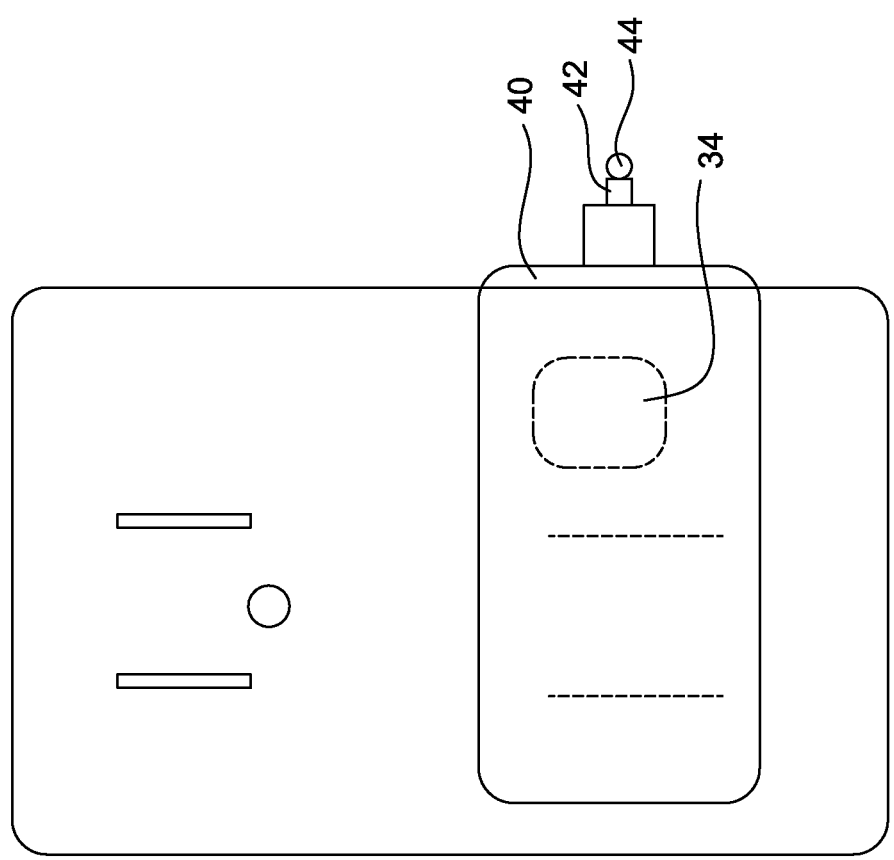
FIG. 2 shows a plan view of a second embodiment of the charging device of the invention.

The inventive device, generally indicated by the numeral 10, is a wireless charging device that can be used to charge any electronic device having a charging/data port. The charging device 10 comes in two different configurations. In a first configuration, the device 10 has a charging transmitter component 20 configured for use in an automotive environment and includes a male connector 22 adapted for insertion into a standard automotive auxiliary outlet 24. In a second configuration, the device 10 has a charging transmitter component 30 configured for use in a home or office environment, with a standard AC two prong plug 32.

Both embodiments 20, 30 include microprocessors 34 to convert the AC or DC input power to a low voltage transmitting DC charging signal. Each charging transmitter 20, 30 also include USB female receptacles 38, 40 to which microprocessors 34 are electrically connected.

A wireless charging antenna 42 compatible with both embodiments 20, 30 is configured for insertion into receptacles 38, 40 for receiving the charging signal from microprocessor 34. Each antenna 42, which is in the form of a small charging coil encased in electrically transparent material such as a hard plastic, is capable of transmitting a low level charging signal of about 5 watts to a device within a few feet of the antenna 42. The charging antenna 42 includes illumination in the form of, e.g., an LED 44 to indicate charging status. The LED 44 can illuminate red to indicate that antenna 42 is powered up, and green to indicate that an acceptable charging voltage has been reached, the colors of course being arbitrary.

A receiving charging component 50 is configured for insertion into the charging port 52 of an electronic device or component 54. The receiving charging component 50 includes processor circuitry 34 and a coil type receiving antenna 55 for receiving an electromagnetic charging signal from charging transmitters 20, 30 and converting that signal to a low level charging signal for the device 54. Device 54 may be any electronic device having a charging port and a battery such as a smart phone, smart watch, tablet, or laptop. A receiving antenna 60 is used to receive signals from transmitters 20, 30 and includes an LED 62 which can illuminate to indicate charging status, that is, whether component 50 is receiving a charging signal of an appropriate voltage. The receiving charging component 50 may be passive, using the energy from the charging source to power LED 62, or may include a small battery.

A key aspect of the invention is that the receiving charging component 50 is made sufficiently small so that it can remain in the device at all times, obviating the need to carry a device specific charging cord. Accordingly, the component 50 is sized less than one inch in any dimension. It can be appreciated that even a small coil antenna 60, placed externally of the device 54 will greatly enhance the ability of the receiving charging component 50 to receive a charging signal from any wireless charger, and even has the effect of extending the reception range of any device 54. Accordingly, the device 10 can also be used to extend the wireless charging signal receiving range even when not used in accordance with the method of the invention. It can be appreciated that a larger coil for antenna 60 will produce more charging power but the coil for antenna 60 must be kept small in order to meet the size requirements as stated above. However, the enhanced reception caused by the externally placed antenna 60 greatly enhances the sensitivity of the receiving charging component 50.

In use, the device 10 is operated by first connecting the charging transmitter 20 or to a respective source of power as described above. Antenna LED 44 of charging transmitter component 30 is illuminated to indicate charging status, to which a specific color such as red is assigned as stated above. The receiving charging component 50 is inserted into the device 54 to be charged and will illuminate red once the charging signal is received. As mentioned above, the receiving charging component 50 remains in the device 54 at all times obviating the need to carry a device specific charging cord. All devices 54 with receiving charging component 50 installed can receive the charging signal if placed within the approximately 4 feet range of transmitter 30. The user can determine when charging is complete by referring to the device 54 that is charging.

I claim:

1. A device for charging one or several electronic components, each of the components having an electrical receptacle for receiving a charging signal, the device comprising:
   a charging component connected to a source of electrical power and having a transmitting antenna;
   a receiving component electrically connected to each of said one or several electronic components via said electrical receptacle, each of the receiving components having a receiving antenna connected to said electronic component, said receiving component being less than one inch in any dimension;
   whereby said transmitting antenna transmits a charging signal receivable by all of said electronic components simultaneously.

2. The device of claim 1 wherein said charging component is connected to a source of AC electrical power.

3. The device of claim 1 wherein said charging component is connected to a source of DC electrical power.

4. The device of claim 1 wherein said charging signal has a range of about 4 feet.

5. The device of claim 1 wherein said charging component has an indicating LED to indicate charging status.

6. The device of claim 1 wherein said charging component has an indicating LED to indicate charging status.

7. A method of charging one or several electronic components using charging device, each of the components having an electrical receptacle for receiving a charging signal, the method comprising the steps of:
   providing a charging component and connecting said charging component to a source of electrical power;
   inserting a receiving component into each of said electrical receptacles, each of the receiving components having a receiving antenna, said receiving component being less than one inch in any dimension; and
   charging all of said electronic components simultaneously by positioning them within a predetermined distance from said charging component.

8. The method of claim 7 wherein said charging component is connected to a source of AC electrical power.

9. The method of claim 7 wherein said charging component is connected to a source of DC electrical power.

10. The method of claim 7 wherein said predetermined distance is about 4 feet.

* * * * *